UNITED STATES PATENT OFFICE.

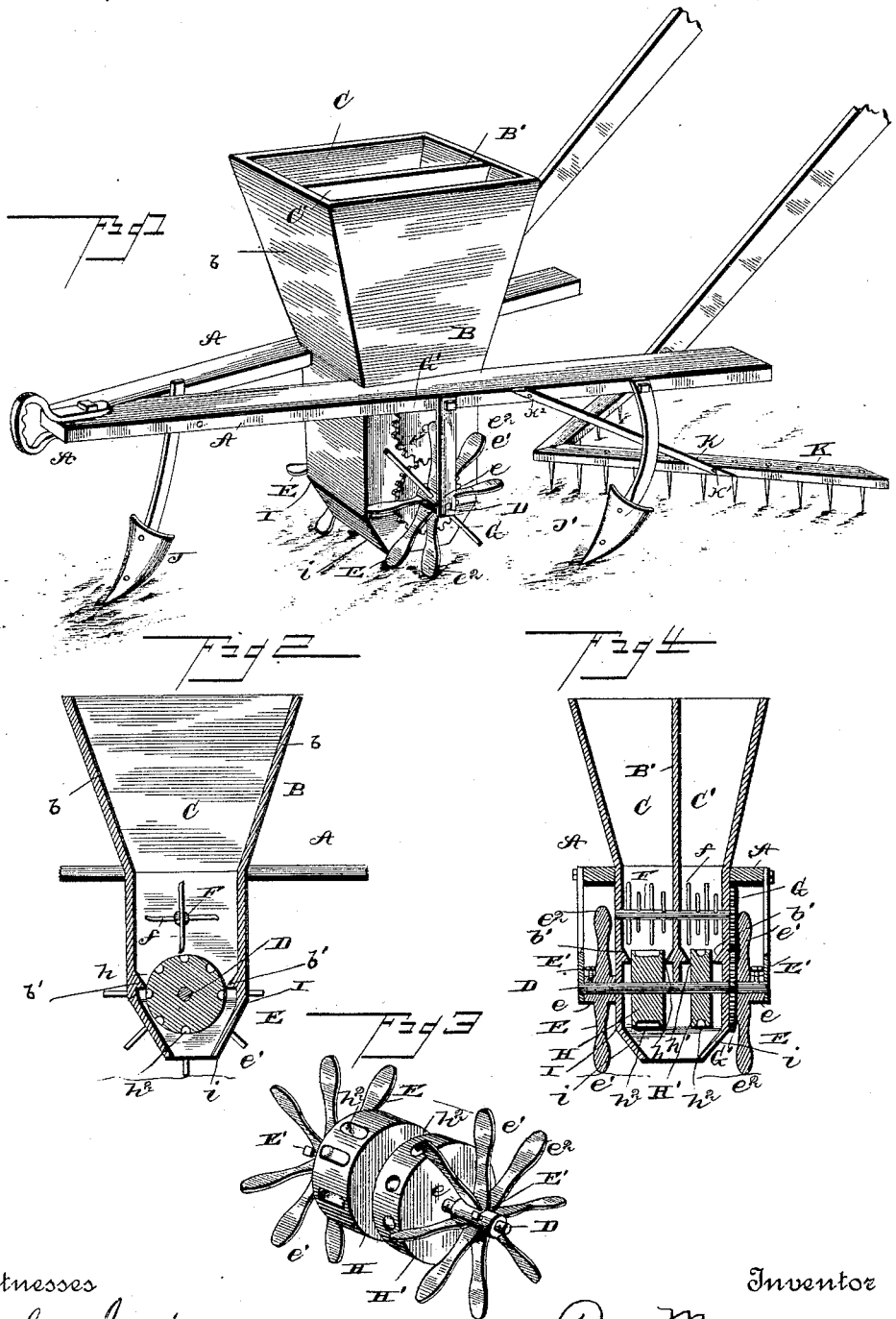

PAUL MONTECINO, OF NAPOLEONVILLE, LOUISIANA.

COMBINED PLANTER AND FERTILIZER-DISTRIBUTER.

SPECIFICATION forming part of Letters Patent No. 460,880, dated October 6, 1891.

Application filed August 4, 1890. Serial No. 360,934. (No model.)

*To all whom it may concern:*

Be it known that I, PAUL MONTECINO, a citizen of the United States, residing at Napoleonville, in the parish of Assumption and State of Louisiana, have invented certain new and useful Improvements in a Combined Planter and Fertilizer-Distributer; and I do hereby declare that the following is a full, clear, and exact description of the invention, which will enable others skilled in the art to which it appertains to make and use the same.

This invention relates to a combined planter and fertilizer-distributer of simple and improved construction; and it has for its object to provide a device of this character adapted to plant seed and distribute fertilizer simultaneously, or to be used as either an independent planter or distributer.

A further object of the invention is to provide a combination-machine of the character described in which the quantity of seed and manure deposited is automatically regulated, and which will furthermore possess advantages in point of inexpensiveness, durability, and general efficiency.

In the drawings, Figure 1 is a perspective view of a combined planter and distributer embodying my invention. Fig. 2 is a vertical longitudinal sectional view taken through the fertilizer or manure distributer compartment. Fig. 3 is a detail perspective view of the shaft, the feed-wheels and markers being shown in position thereon. Fig. 4 is a vertical transverse sectional view of the planter.

Corresponding parts in the figures are denoted by the same letters of reference.

Referring to the drawings, A A designate two parallel beams converging forwardly and intersecting one another at their forward ends. Between the beams A is mounted a hopper B, having its ends $b$ $b$ diverging upwardly, and within the hopper is provided a removable longitudinally-disposed partition B′, dividing the same into two compartments C C′, respectively adapted for manure and seed, the former being of a greater width than the latter.

D designates a transverse shaft journaled underneath the beams A, and upon the ends of which are mounted markers E E. The markers E comprise each a hub $e$, from which projects a series of radially-disposed teeth $e'$, preferably formed integral therewith and adapted to effect the rotation of the shaft, when the device is in operation, by contact with the ground. These teeth are formed with broadened outer ends $e^2$, whereby they are adapted to take a firm hold in the ground and effect positive rotation of the shaft D. The markers E are each secured to the shaft by a set-screw E′, passed through a threaded perforation therefor in one side of the hub $e$, and adapted to be bound against the shaft. By loosening the set-screws the markers are permitted to rotate independent of the shaft, and the planter may be thus transported without loss of manure or seed.

Journaled within the sides of the hopper is a shaft F, disposed above the shaft D and provided in each of the compartments of the hopper with agitating-fingers $f$. To impart motion to this shaft, a gear-wheel G is mounted on one end thereof at the exterior of the hopper, which meshes with a gear-wheel G′, carried by the shaft D between the side of the hopper and the adjacent marker. The agitating-fingers are thus kept continuously in motion during the rotation of the shaft D, and serve to effectually stir the manure and seed.

H H′ designate, respectively, the manure and seed feed wheels, which are mounted upon the shaft D and partially project through the openings $h$ $h'$ at the bottom of each compartment of the hopper, the outer sides of the latter being provided with downwardly-converging interior flanges $b'$ $b'$, abutting against the adjacent sides of said feed-wheels. The latter are provided at their peripheries with recesses or cups $h^2$, adapted to receive the manure or seed during the passage of such recesses or cups through the hopper. The number of these recesses or cups in the seed-feed wheel correspond to those in the manure-wheel, but are of smaller size, while the breadth of the latter wheel is materially greater than the former. The sides of the hopper are extended to below the feed-wheels, as shown at I I, and have their lower ends $i$ $i$ bent inwardly, leaving a narrow opening between said ends, through which the manure and seed is dropped.

J and J′ J′ designate, respectively, opener and coverer plows having their standards secured to the frame, said plows being disposed in front and at the rear of the hopper. A harrow K is also provided, located in rear of the coverer-plows, and adapted to level the surface of the ground after the passage of the latter. The harrow K is connected with the frame by inclined rods k k, pivotally secured thereto, as shown at k' k², respectively.

The operation and advantages of my invention will be readily understood by those skilled in the art to which it appertains.

In practice motion is imparted to the shaft D by the markers, which rotate upon the ground, and to the shaft F by the gearing between the same and the former shaft. As the feed-wheels rotate the recesses or cups therein pass through the respective compartments of the hopper and become filled with manure and seed, which are discharged during the further rotation of the wheels. It will be obvious that the device may also be used separately as either a manure-distributer or planter by the employment of the respective compartment therefor independently.

I claim as my invention—

In a combined planter and fertilizer-distributer, the combination of a hopper unequally divided into two compartments by a partition having a contracting rib on each side of the lower portion thereof in line with like ribs on the sides of the hopper to form double contracted feed-openings, below which the hopper is extended and contracted at its lower end, a driving-shaft extending through the said extension of the hopper having a broad-bladed operating-marker on each end, and feed-wheels of different thicknesses engaging said contracted feed-openings of the hopper, the said partition extending down to said shaft to form a shield and the openings in said wheels being of different dimensions, the agitators above the feed-wheels and the gearing on the agitator and drive-shaft being operated by said broad-bladed markers, substantially as described.

In testimony whereof I affix my signature in presence of two witnesses.

PAUL MONTECINO.

Witnesses:
OSCAR DUGAS,
LOUIS CORDE.